Patented Sept. 11, 1945

2,384,595

UNITED STATES PATENT OFFICE 2,384,595

LUBRICATING OIL

Charles M. Blair, Jr., Webster Groves, Mo., assignor to Petrolite Corporation, Ltd., Wilmington, Del., a corporation of Delaware No Drawing. Original application May 31, 1943, Serial No. 489,237. Divided and this application February 21, 1944, Serial No. 523,349

7 Claims. (Cl. 252—56)

This application is a division of my pending application Serial No. 489,237, filed May 31, 1943, and relates to an improved lubricating oil.

In my parent application for patent above referred to I have disclosed a new type of polyester products of high molecular weight, consisting of polyesters of a resinous or semi-resinous character, that can be produced or prepared by esterifying an alpha-beta unsaturated acid or anhydride with an unsaturated aliphatic alcohol, of a particular kind therein described, under conditions which result in polymerization of the ester.

My present invention consists of a new composition, composed of or comprising a relatively small amount of a condensation polymer of the kind described in my parent application above referred to, and a lubricating oil.

The preparation of resinous and semi-resinous products by reaction of multifunctional acids with multi-functional alcohols is, of course, an old and well known art. More recently polyesters of high molecular weight have been prepared by polymerizing ethyl or methyl esters of fumaric and maleic acids. Still more recently, resinous products have been prepared by polymerizing esters of polybasic acids in which at least one of the carboxyl groups is esterified with a low molecular weight, unsaturated alcohol, such as allyl alcohol, methallyl alcohol, crotyl alcohol, methyl vinyl carbinol, or other highly reactive unsaturated alcohol of the allyl type.

The reactions leading to resinification of esters of the low molecular weight unsaturated alcohols mentioned above apparently depend upon the extreme reactivity of the unsaturated alcohols and the tendency for these to condense with themselves or with one another under relatively mild conditions. Esterification of these alcohols does not completely inhibit their ability to condense. Alcohols which have been described as suitable for preparing such resins, are those of the allyl type, and all are characterized by the fact that the carbon atom attached to the hydroxyl group is in turn attached to an ethylenic carbon atom.

I have found that very unusual and useful polymeric substances may be prepared from unsaturated carboxylic acids and certain unsaturated alcohols, which may not be multireactive in the sense that the acids have two or more carboxyl groups and the alcohols two or more hydroxyl groups. More specifically, the polymeric compositions of the present invention are those obtained by reacting alpha beta unsaturated acids or anhydrides with unsaturated aliphatic or cycloaliphatic alcohols in which the ethylenic carbon atom nearest to the carbon atom attached to the hydroxyl group is separated from said hydroxyl attached carbon by at least three singly bonded carbon atoms.

Acidic reactants found suitable for use in the preparation of the above mentioned polymeric substances, are the alpha beta unsaturated acids and anhydrides, preferably those containing less than 10 carbon atoms. Examples of such acids and anhydrides are crotonic acid, maleic acid, fumaric acid, citraconic acid, glutaconic acid, aconitic acid, itaconic acid, mesaconic acid, maleic anhydride, citraconic anhydride, itaconic anhydride, and the like. Suitable acidic reactants may be monobasic, dibasic, or polybasic. Because of their relatively low cost and availability in commercial quantities, maleic anhydride, fumaric acid, and citraconic anhydride are especially useful; and products obtained with these reactants will be used below to illustrate the present invention.

Suitable alcohols for use in preparing the polymeric substances are the aliphatic and cycloaliphatic unsaturated alcohols, in which the ethylenic carbon atom nearest to the hydroxyl group is separated from the carbon atom attached to said hydroxyl group by at least three singly bonded carbon atoms. Such alcohols may be monohydric, dihydric, or polyhydric; they may be primary, secondary, or tertiary; and they contain one or more carbon-to-carbon double bonds. My preferred class of alcohols are the primary and secondary monohydric, aliphatic, and cycloaliphatic unsaturated alcohols which contain 8 or more carbon atoms, and contain less than 32 carbon atoms, and which satisfy the above stated requirement for position of the double bond with respect to the hydroxyl group. Examples of preferred alcohols are: Octene-3-ol-8, decene-1-ol-10, oleyl alcohol, erucyl alcohol, linoleyl alcohol, eicosene-10-ol-1, citronellol, rhodinol, abietyl alcohol, dihydroabietyl alcohol, crude sperm oil alcohols, crude jojoba oil alcohols, and the like. The most desirable type of alcohol contains at least 18 carbon atoms and not over 22, and is monoethylenic in character.

To prepare the polymeric substances used in the new composition herein described, the desired alpha beta unsaturated acid is reacted with the desired unsaturated alcohol at a temperature which may range from about 100° C. to about 250° C. for a period of several hours, or until the viscosity and molecular weight of the product has reached the desired value. The reaction appears to involve both esterification and addition at the double bond of one of the unsaturated reactants. Esterification catalysts such as sulfuric acid, beta camphor sulfonic acid, toluene sulfonic acid, etc., may be employed. Olefine polymerization catalysts such as benzoyl peroxide may also be employed. However, such catalysts are unnecessary, as appreciable polymerization may be obtained simply by heating the reactants at the proper temperature, for a period of several hours.

To obtain the highest degree of polymerization in the shortest period of time, I have found that certain conditions of reaction are particularly desirable. The determination of these reaction conditions actually constitutes an invention within an invention, in that it makes possible the preparation of the most desirable polymeric products with the minimum of time and effort. In particular, I have found that the polymerization is promoted by passing through the mixture, during reaction, a slow stream of oxygen or oxygen-containing gas, such as air. The beneficial effect of this operation appears to arise directly from the oxygen in the gas used. If nitrogen, hydrogen or other inert oxygen-free gases are passed through the mixture, the rate of polymerization is not appreciably increased. The use of benzoyl peroxide, also, does not catalyze the polymerization to an extent comparable to that obtained with oxygen gas. In fact, extensive efforts to find a comparable catalyst have so far failed.

When using oxygen or oxygen-containing gas as a catalyst, the temperature of the reaction may vary over rather wide limits; but I have obtained best results within the range of 110° C. to 215° C. With reactants that boil within this temperature range, it is desirable to react the materials under pressure, or to conduct the reaction for a while at a lower temperature until esterification of the reactants has produced an intermediate of higher boiling point. The temperature may then be gradually increased to a higher value. At extremely high temperatures, decomposition and oxidation of the product may occur to an objectionable degree.

The following examples will serve to illustrate the methods of preparation which may be employed. Parts are by weight.

*Example 1*

135 parts of commercial oleyl alcohol (iodine No. 71.0) and 50 parts of maleic anhydride were heated and stirred in a flask fitted with an air condenser. The temperature was raised, over a period of two hours, to 240° C., and was held at this point for 12 hours.

The product was a light red, soft wax at room temperature. It had an iodine number of 46.5, a neutralization equivalent of 1090, and a molecular weight (cryoscopic in benzene) of 3290. The product was clearly soluble in lubricating oil.

*Example 2*

135 parts of commercial oleyl alcohol (iodine No. 71.0) and 50 parts of maleic anhydride were heated and stirred in the apparatus of Example 1. After raising the temperature over a one-hour period to 160° C., a gas inlet tube was introduced into the flask and a slow stream of air was allowed to bubble through the liquid. The temperature was held at 160° for 18 hours, while allowing air to bubble through the flask contents.

The product was a reddish, viscous oil at room temperature. It was clearly soluble in an SAE 20 lubricating oil in all proportions. Dilute solutions in lubricating oil greatly increased the viscosity index of same.

*Example 3*

The reactants of Example 2 were held for 27 hours at 160° C. while passing through a slow stream of air.

The product was a stiff rubbery mass. It was partially soluble in lubricating oils, giving very viscous solutions.

*Example 4*

157 parts of crude jojoba oil alcohols (mainly eicosenyl and docosenyl alcohols) was substituted for the commercial oleyl alcohol of Example 2.

The product was similar in properties to that of Example 2.

*Example 5*

59 parts of fumaric acid was substituted for the maleic anhydride of Example 2. A water trap under a water-cooled condenser served to catch evolved water.

The product was almost identical in properties to that of Example 2.

*Example 6*

86 parts of crotonic acid and 282 parts of dihydroabietyl alcohol were heated and stirred in a flask equipped with a stirrer, gas inlet tube, condenser and water trap. The temperature was raised to 190° C. over a period of one hour and was held at this temperature for three hours, or, until approximately one mole of water had collected in the water trap. A slow stream of air was then introduced through the gas inlet tube, and the temperature was raised to 210° C. and was held at this point for 48 hours.

*Example 7*

Linoleyl alcohol was substituted for the oleyl alcohol in Example 2.

It will be noted that some of the above products, for example, those of Examples 1, 2, 3, 4, 5 and 7, are prepared from one molal proportion of a dibasic acid and one molal proportion of a monohydric alcohol. Such products contain some free carboxyl groups. Analysis of the product of Example 1 indicates that somewhat less than the theoretical number of carboxylic acid groups remains. It is believed that this result may arise from some decarboxylation at the temperature of reaction, i. e., 240° C.

Products containing free carboxylic acid groups may be reacted with alkalies, amines, heavy metal oxides, etc., to yield polymeric salts which have useful properties in addition to those of the polymers alone. Salts, such as the sodium salt of the product of Example 2, may be used as sludge dispersers or detergents in lubricating oil. The lead salt of the product of Example 2 may also be used as a thickening agent and detergent in oils.

In general, products of the present invention which contain free carboxyl groups may be employed as such, as the metal or amine salt, as an amide, or, in some cases, as the esters of mono-, di-, or polyhydric alcohols. When such carboxyl-containing products are esterified with long chain aliphatic alcohols, especially useful products are obtained, which are made the subject of my copending application Serial No. 489,238, filed May 31, 1943.

The nature of the reaction which results in the formation of the present products is not clearly understood, but it is believed that the alpha beta unsaturated acid esterifies the hydroxyl group of the alcohol and also condenses by proton transfer, with the unsaturated alcohol at an ethylenic carbon atom of same, or at a carbon atom near the double bond. The unsaturated alcohol undergoing condensation with a molecule of ethylenic acid is probably esterified by a different molecule of ethylenic acid; so a type of linear polyester is formed. When the double bond of the unsaturated alcohol is nearer to the hydroxyl group than allowed by the conditions previously given, good yields of the desired products are not obtained. It is believed that this is the result of the formation of stable, cyclic, inner esters, rather than linear polyesters.

Various possible reactions which are believed might occur in the preparation of the present compounds, are as follows, employing an unsaturated aliphatic alcohol and an alpha beta, ethylenic, monocarboxy, aliphatic acid:

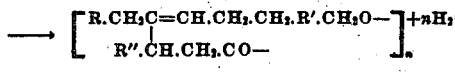

or

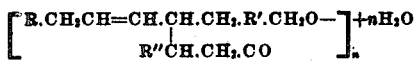

or

or

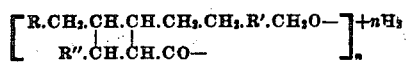

or

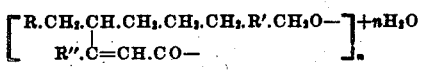

or

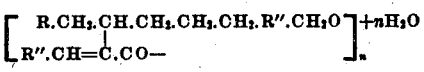

or

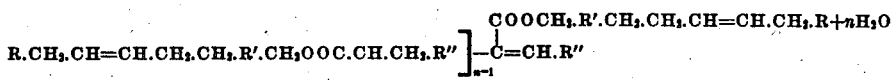

In the above formulae, R and R'' represent alkyl groups which contain one or more carbon atoms, and R' is an alkylene group which may contain one or more carbon atoms. $n$ is a whole number. Where the ethylenic acid is di- or polybasic, reactions similar to the above may also occur.

In addition to the above reactions, several others are conceivably possible. However, it is understood that the exact reactions are a matter of speculation or conjecture, and may vary, depending, in part, on the particular reactants selected. Such reactions are not to be construed as a limitation in any respect, but are submitted in order to show the diverse nature of the possible or probable reactions involved, and additionally, to indicate the inability adequately to portray the invention in terms of conventional chemical formulae.

My present invention consists in using products of the kind previously described, to increase the viscosity, and viscosity index of lubricating oils, or consists of a new composition of matter composed of a relatively small amount of such a condensation polymer and a lubricating oil.

The following are examples of my new composition:

Example I

2½% by weight of the product of Example 2, above, was added to a lubricating oil having a viscosity index of 70, and a viscosity at 210° F. of 46 seconds. The resulting clear oil solution had a viscosity index of 127 and a viscosity of 58 seconds at 210° F.

Example II

2% by weight of the product of Example 5, above, was added to a lubricating oil having a viscosity index of 60 and a viscosity at 210° F. of 44.9 seconds. The resulting oil had a viscosity index of 85.0 and a viscosity at 210° F. of 47.2 seconds.

Greater or lesser effects on viscosity index than those illustrated above may be obtained by adding more or less reagent. Using a product of higher intrinsic viscosity, such as that of Example 3, less reagent is required for a desired improvement in viscosity index. In general, the percentages of such products which will be employed varies from as little as 0.25% to as much as 5%, or even more, depending upon the use to which the oil is to be put. Thus, one object of my invention is the preparation of such improved lubricating oils or lubricating oil composition by adding not less than about 0.25%, or more than about 5% of the herein described compounds to lubricating oils, such as are used in internal combustion engines.

The present products are, in general, unsaturated, as reaction does not remove all of the olefinic groups of the unsaturated reactants. If desired, these products may be hydrogenated to remove olefinic double bonds. Other chemical reactions may be employed to modify the properties of the polymers. For example, they may be treated with sulfur at elevated temperatures to form sulfurized polymers useful as antioxidants and film strength improvers for petroleum or fatty oils.

Compounds of the type herein contemplated are referred to as condensation polymers. This is in conformity with nomenclature in Organic Chemistry, Gilman, 2nd edition, volume 2, page 702.

Previous reference has been made to the fact that one may employ either aliphatic or cyclo-aliphatic alcohols of the kind described. Although, ordinarily speaking, unsaturated aliphatic alcohols and unsaturated cyclo-aliphatic alcohols are not necessarily the obvious equivalent of each other, yet in light of what has been said above, it is obvious that they are the functional equivalent in the present instance. In the hereto appended claims reference to an aliphatic alcohol is intended to include the cyclo-aliphatic alcohols. Reference to a straight chain alcohol must, of course, contemplate only the acyclic type.

Having thus described my invention, what I claim as new and desire to secure by Letters Patent is:

1. A lubricating oil, consisting of a mineral lubricating oil and a relatively small amount of an ester; the amount of said ester being within the approximate range of 0.25% to 5%, by weight, based on the weight of the aforementioned mineral lubricating oil, and said ester being an alpha-beta unsaturated carboxylic acid-unsaturated aliphatic alcohol polyester addition-condensation polymer; said acid containing less than 10 carbon atoms and being free from vinyl radicals and said alcohol containing at least 8 and less than 32 carbon atoms, and having at least 3 intervening carbon atoms between the carbon atoms to which the hydroxyl group is attached and the nearest ethylenic carbon atom.

2. A lubricating oil, consisting of a mineral lubricating oil and a relatively small amount of an ester; the amount of said ester being within the approximate range of 0.25% to 5%, by weight, based on the weight of the aforementioned mineral lubricating oil, and said ester being an alpha-beta unsaturated carboxylic acid-unsaturated straight chain aliphatic alcohol polyester addition-condensation polymer; said acid containing less than 10 carbon atoms and being free from vinyl radicals and said alcohol containing at least 8 and less than 32 carbon atoms, and having at least 3 intervening carbon atoms between the carbon atom to which the hydroxyl group is attached and the nearest ethylenic carbon atom.

3. A lubricating oil, consisting of a mineral lubricating oil and a relatively small amount of an ester; the amount of said ester being within the approximate range of 0.25% to 5%, by weight, based on the weight of the aforementioned mineral lubricating oil, and said ester being an alpha-beta monoethylenic carboxylic acid-unsaturated straight chain aliphatic alcohol polyester addition-condensation polymer; said acid containing less than 10 carbon atoms and being free from vinyl radicals and said alcohol containing at least 18 and not over 22 carbon atoms, and having at least 3 intervening carbon atoms between the carbon atom to which the hydroxyl group is attached and the nearest ethylenic carbon atom.

4. A lubricating oil, consisting of a mineral lubricating oil and a relatively small amount of an ester; the amount of said ester being within the approximate range of 0.25% to 5%, by weight, based on the weight of the aforementioned mineral lubricating oil, and said ester being an alpha-beta monoethylenic dicarboxylic acid-unsaturated straight chain aliphatic alcohol polyester addition-condensation polymer; said acid containing less than 10 carbon atoms and being free from vinyl radicals and said alcohol containing at least 18 and not over 22 carbon atoms, and having at least 3 intervening carbon atoms between the carbon atom to which the hydroxyl group is attached and the nearest ethylenic carbon atom.

5. A lubricating oil, consisting of a mineral lubricating oil and a relatively small amount of an ester; the amount of said ester being within the approximate range of 0.25% to 5%, by weight, based on the weight of the aforementioned mineral lubricating oil and said ester being a maleic acid-monoethylenic straight chain aliphatic alcohol polyester addition-condensation polymer; said alcohol containing at least 18 and not over 22 carbon atoms, and having at least 3 intervening carbon atoms between the carbon atom to which the hydroxyl group is attached and the nearer ethylenic carbon atom.

6. A lubricating oil, consisting of a mineral lubricating oil and a relatively small amount of an ester; the amount of said ester being within the approximate range of 0.25% to 5%, by weight, based on the weight of the aforementioned mineral lubricating oil and said ester being a fumaric acid-monoethylenic straight chain aliphatic alcohol polyester addition-condensation polymer; said alcohol containing at least 18 and not over 22 carbon atoms, and having at least 3 intervening carbon atoms between the carbon atom to which the hydroxyl group is attached and the nearer ethylenic carbon atom.

7. A lubricating oil, consisting of a mineral lubricating oil and a relatively small amount of an ester; the amount of said ester being within the approximate range of 0.25% to 5%, by weight, based on the weight of the aforementioned mineral lubricating oil and said ester being a citraconic acid-monoethylenic straight chain aliphatic alcohol polyester addition-condensation polymer; said alcohol containing at least 18 and not over 22 carbon atoms, and having at least 3 intervening carbon atoms between the carbon atom to which the hydroxyl group is attached and the nearer ethylenic carbon atom.

CHARLES M. BLAIR, Jr.